(12) United States Patent
Yu

(10) Patent No.: US 7,661,852 B2
(45) Date of Patent: Feb. 16, 2010

(54) INTEGRATED LED BULB

(75) Inventor: Jing Jing Yu, El Monte, CA (US)

(73) Assignee: 1 Energy Solutions, Inc., El Monte, CA (US)

( * ) Notice: Subject to any disclaimer, the term of this patent is extended or adjusted under 35 U.S.C. 154(b) by 0 days.

(21) Appl. No.: 11/849,939

(22) Filed: Sep. 4, 2007

(65) Prior Publication Data

US 2008/0013324 A1 Jan. 17, 2008

Related U.S. Application Data

(63) Continuation of application No. 11/189,066, filed on Jul. 26, 2005, now abandoned.

(60) Provisional application No. 60/949,804, filed on Jul. 13, 2007.

(51) Int. Cl.
*F21V 23/00* (2006.01)

(52) U.S. Cl. .............. 362/362; 362/800; 362/646; 362/650; 362/429; 362/435; 362/437; 362/448; 362/378; 362/353

(58) Field of Classification Search .......... 362/362, 362/646, 650, 649, 647, 429, 435, 437, 448, 362/378, 353; 313/200 R, 205, 207, 200 A, 313/185 S, 312, 322–325; 315/200 R, 205, 315/207, 200 A, 185 S, 312, 322–325
See application file for complete search history.

(56) References Cited

U.S. PATENT DOCUMENTS

| 1,694,997 | A | | 12/1928 | Van Horn | |
|---|---|---|---|---|---|
| 3,440,517 | A | * | 4/1969 | Carter et al. | 363/86 |
| 3,519,913 | A | * | 7/1970 | Janecek | 388/821 |
| 3,593,038 | A | | 7/1971 | Hylten-Cavallius | |
| 3,639,822 | A | | 2/1972 | Brown | |
| 3,758,771 | A | | 9/1973 | Frohardt | |
| 4,035,681 | A | | 7/1977 | Savage | |
| 4,074,165 | A | | 2/1978 | Moriyama | |
| 4,223,248 | A | | 9/1980 | Tong | |
| 4,298,869 | A | | 11/1981 | Okuno | |
| 4,316,125 | A | | 2/1982 | Noguchi | |
| 4,321,598 | A | | 3/1982 | Warner | |

(Continued)

FOREIGN PATENT DOCUMENTS

CA 2342321 3/2000

OTHER PUBLICATIONS

U.S. Appl. No. 09/339,616; Inventor: Tuyet Thi Vo; abandoned.

(Continued)

*Primary Examiner*—Sharon E Payne
(74) *Attorney, Agent, or Firm*—William W. Cochran; Cochran Freund & Young LLC

(57) ABSTRACT

Disclosed is an integrated LED bulb that utilizes LEDs and can be used as a standard replacement bulb for incandescent lights that operate on standard household current. One or more LEDs are disposed in a lens 102 that is capable of high optical transmission efficiencies. A base portion encapsulates a printed circuit board and connectors, as well as the LED pin leads to hold the package in a secure mounting. The lens can be molded directly to the base or can be removable. The base can be formed to fit standard threaded sockets or bayonet sockets.

6 Claims, 3 Drawing Sheets

U.S. PATENT DOCUMENTS

| | | |
|---|---|---|
| 4,329,625 A | 5/1982 | Nishizawa |
| 4,348,663 A | 9/1982 | Yanagishima |
| 4,365,244 A | 12/1982 | Gillessen |
| 4,367,471 A | 1/1983 | Gillessen |
| 4,396,823 A | 8/1983 | Nihei |
| 4,492,952 A | 1/1985 | Miller |
| 4,521,835 A | 6/1985 | Meggs |
| 4,528,619 A | 7/1985 | Dolan |
| 4,595,920 A | 6/1986 | Runyan |
| 4,652,981 A | 3/1987 | Glynn |
| 4,675,575 A | 6/1987 | Smith |
| 4,727,603 A | 3/1988 | Howard |
| 4,807,098 A | 2/1989 | Ahroni |
| 4,839,777 A | 6/1989 | Janko |
| 4,843,280 A | 6/1989 | Lumbard |
| 4,857,920 A | 8/1989 | Kataoka |
| 4,954,822 A | 9/1990 | Borenstein |
| 4,959,766 A | 9/1990 | Jain |
| 4,967,330 A | 10/1990 | Bell et al. |
| 5,087,212 A | 2/1992 | Hanami |
| 5,130,897 A | 7/1992 | Kuzma |
| 5,155,669 A | 10/1992 | Yamuro |
| 5,187,377 A | 2/1993 | Katoh |
| 5,193,895 A | 3/1993 | Naruke |
| 5,239,872 A | 8/1993 | Meyer-Bisch |
| 5,257,020 A | 10/1993 | Morse |
| 5,313,187 A | 5/1994 | Choi |
| 5,321,593 A | 6/1994 | Moates |
| 5,323,305 A | 6/1994 | Ikeda |
| 5,366,780 A | 11/1994 | Rapisarda |
| 5,404,282 A | 4/1995 | Klinke |
| 5,410,458 A | 4/1995 | Bell |
| 5,436,809 A | 7/1995 | Brassier |
| 5,457,450 A | 10/1995 | Deese |
| 5,463,280 A | 10/1995 | Johnson |
| 5,481,444 A | 1/1996 | Schultz |
| 5,499,174 A | 3/1996 | Lin |
| 5,528,484 A | 6/1996 | Hayashi |
| 5,567,037 A | 10/1996 | Ferber |
| 5,580,159 A | 12/1996 | Liu |
| 5,647,759 A | 7/1997 | Lien |
| 5,649,755 A | 7/1997 | Rapisarda |
| 5,655,830 A | 8/1997 | Ruskouski |
| 5,660,560 A | 8/1997 | Cheng |
| 5,663,719 A | 9/1997 | Deese |
| 5,670,847 A | 9/1997 | Lin |
| 5,672,000 A | 9/1997 | Lin |
| 5,681,107 A | 10/1997 | Wang |
| 5,720,544 A | 2/1998 | Shu |
| 5,722,860 A | 3/1998 | Pan |
| 5,726,535 A | 3/1998 | Yan |
| 5,762,419 A | 6/1998 | Yam |
| 5,808,592 A | 9/1998 | Mizutani |
| 5,887,967 A | 3/1999 | Chang |
| 5,890,794 A | 4/1999 | Abtahi |
| 5,936,599 A | 8/1999 | Reymond |
| 5,941,626 A | 8/1999 | Yamuro |
| 5,962,971 A | 10/1999 | Chen |
| 5,988,831 A | 11/1999 | Pan |
| 6,048,074 A | 4/2000 | Wang |
| 6,072,280 A | 6/2000 | Allen |
| 6,079,848 A | 6/2000 | Ahroni |
| 6,120,312 A | 9/2000 | Shu |
| 6,183,104 B1 | 2/2001 | Ferrara |
| 6,183,310 B1 | 2/2001 | Shu |
| 6,190,021 B1 | 2/2001 | Huang |
| 6,200,003 B1 | 3/2001 | Tseng |
| 6,227,679 B1 | 5/2001 | Zhang |
| 6,283,797 B1 | 9/2001 | Wu |
| 6,361,198 B1 | 3/2002 | Reed |
| 6,367,952 B1 | 4/2002 | Gibboney |
| 6,461,019 B1 | 10/2002 | Allen |
| 6,478,455 B2 | 11/2002 | Ahroni |
| 6,505,954 B2 | 1/2003 | Chen |
| 6,550,953 B1 | 4/2003 | Ichikawa et al. |
| D474,848 S | 5/2003 | Lodhie |
| D474,849 S | 5/2003 | Lodhie |
| 6,598,996 B1 | 7/2003 | Lodhie |
| D485,379 S | 1/2004 | Steklenbug |
| 6,709,132 B2 | 3/2004 | Ishibashi |
| 6,717,526 B2 | 4/2004 | Martineau |
| 6,739,733 B1 * | 5/2004 | Lamke et al. ............... 362/646 |
| 6,758,578 B1 | 7/2004 | Chou |
| 6,830,358 B2 | 12/2004 | Allen |
| 7,012,379 B1 | 3/2006 | Chambers et al. |
| 7,014,352 B2 | 3/2006 | Wu |
| 7,045,965 B2 | 5/2006 | Yu |
| 7,063,442 B2 * | 6/2006 | Sugar ........................ 362/252 |
| 7,066,628 B2 | 6/2006 | Allen |
| 7,066,636 B2 | 6/2006 | Wu |
| 7,118,249 B2 | 10/2006 | Hsu et al. |
| 7,166,964 B2 * | 1/2007 | Weyhrauch et al. ........... 315/51 |
| 7,217,005 B2 | 5/2007 | Lin |
| 7,220,022 B2 | 5/2007 | Allen et al. |
| 2002/0043943 A1 | 4/2002 | Menzer et al. |
| 2002/0105438 A1 | 8/2002 | Forbes |
| 2003/0025120 A1 | 2/2003 | Chang |
| 2003/0079387 A1 | 5/2003 | Derose |
| 2003/0147245 A1 * | 8/2003 | Chen ......................... 362/363 |
| 2003/0198048 A1 | 10/2003 | Frederick |
| 2004/0135522 A1 | 7/2004 | Berman |
| 2004/0140892 A1 | 7/2004 | Hanood |
| 2004/0190289 A1 | 9/2004 | Liu |
| 2004/0190290 A1 | 9/2004 | Zerphy et al. |
| 2004/0233145 A1 | 11/2004 | Chiang |
| 2005/0057187 A1 | 3/2005 | Catalano |
| 2005/0162851 A1 | 7/2005 | Kazar et al. |
| 2005/0225985 A1 | 10/2005 | Catalano |
| 2006/0007679 A1 | 1/2006 | Allen |
| 2006/0012349 A1 | 1/2006 | Allen |
| 2006/0012997 A1 | 1/2006 | Catalano |
| 2006/0044788 A1 | 3/2006 | Damrau |
| 2006/0098442 A1 | 5/2006 | Yu |
| 2006/0180822 A1 | 8/2006 | Yu |
| 2006/0203482 A1 | 9/2006 | Allen |
| 2006/0270250 A1 | 11/2006 | Allen |
| 2007/0025109 A1 | 2/2007 | Yu |
| 2007/0064450 A1 | 3/2007 | Chiba et al. |
| 2007/0159860 A1 * | 7/2007 | Haeberle et al. ............... 363/44 |
| 2007/0183153 A1 | 8/2007 | Yu |
| 2008/0157686 A1 | 7/2008 | Chung et al. |

OTHER PUBLICATIONS

U.S. Appl. No. 09/378,631, Inventor: Tuyet Thi Vo; abandoned.
U.S. Appl. No. 60/949,804, filed Jul. 13, 2007, by Jing Jing Yu.
Non-Final Office Action mailed May 23, 2005, in U.S. Appl. No. 10/767,820, filed Jan. 30, 2004 by Minzhu Li.
U.S. Appl. No. 11/716,788, filed Mar. 12, 2007, by Jing Jing Yu.
Non-Final Office Action mailed Aug. 18, 2008, in U.S. Appl. No. 11/461,293, filed Jul. 31, 2006, by Jing Jing Yu.
Non-Final Office Action mailed May 16, 2008, in U.S. Appl. No. 11/461,293, filed Jul. 31, 2006, by Jing Jing Yu.
Non-Final Office Action mailed Dec. 12, 2007, in U.S. Appl. No. 11/461,293, filed Jul. 31, 2006, by Jing Jing Yu.
Non-Final Office Action mailed Jun. 04, 2007, in U.S. Appl. No. 11/189,066, filed Jul. 26, 2005, by Jing Jing Yu.
Non-Final Office Action mailed Feb. 07, 2006, in U.S. Appl. No. 10/984,651, filed Nov. 10, 2004, by Jing Jing Yu.
Non-Final Office Action mailed Feb. 15, 2007, in U.S. Appl. No. 11/056,148, filed Feb. 14, 2005, by Jing Jing Yu.
Non-Final Office Action mailed Jun. 14, 2007, in U.S. Appl. No. 11/350,343, filed Feb. 9, 20006, by Jing Jing Yu.

* cited by examiner

INTEGRATED LED BULB

CROSS REFERENCE TO RELATED APPLICATIONS

This application is a continuation of U.S. patent application Ser. No. 11/189,066 entitled "C7, C9 LED Bulb and Embedded PCB Circuit Board," by Jing Jing Yu, filed Jul. 26, 2005, and is based upon U.S. Provisional Patent Application Ser. No. 60/949,804, entitled "Watertight LED Lamp," by Jing Jing Yu, filed Jul. 13, 2007. The entire contents of the above mentioned applications are hereby specifically incorporated herein by reference for all they disclose and teach.

BACKGROUND OF THE INVENTION

Lighting is an important part of everyday life. Since the time that light bulbs were invented in 1879, light bulbs have had a significant effect on human activity by providing illumination in areas and at times that would not otherwise allow such activities. One of the goals of developing lighting technologies is to meet desired illumination requirements for various activities in various venues, such as homes, offices, restaurants, etc., and for various purposes, including utility and decorative purposes.

Light emitting diodes (LEDs) are semiconductor diodes that belong to the group of electroluminescent luminaries. Photons are emitted from LEDs by recombining charge-carrier pairs in a semiconductor with an appropriate energy band gap. As a result, LEDs provide narrow bands of radiation. LEDs constitute desirable sources of lighting because they operate at low voltage and power, are small and have an extended lifetime and stability.

SUMMARY OF THE INVENTION

An embodiment of the present invention may comprise: an integrated LED bulb that replaces C-type incandescent bulbs comprising: a lens; a printed circuit board comprising: conductor leads that are connected to electrical conductors that connect to an alternating current electrical source; a full wave rectifier that rectifies the alternating current electrical source to generate a full wave rectified output signal; an integrating capacitor that integrates the full wave rectified output signal to generate an integrated direct current signal; a zener diode that controls the voltage level of the integrated direct current signal to produce a substantially constant output voltage; at least one light emitting diode disposed in the lens that is connected in parallel with the zener diode, and that generates a substantially constant optical output in response to the substantially constant output voltage produced by the zener diode, the light emitting diode having pin leads that are soldered directly to the printed circuit board; a base that is over-molded around the printed circuit board, the conductors, and the leads that are connected to the electrical conductors and the pin leads that are soldered to the printed circuit boards to form a secure, stable base that protects the printed circuit board, and which has a standard format for C-type bulbs, so that the base fits into standard C-type bulb sockets that are attached to the alternating current electrical source.

Another embodiment of the present invention may comprise: a method of making an LED bulb that replaces C-type incandescent bulbs comprising: providing a lens; providing at least one LED; connecting the at least one LED in parallel with a zener diode disposed on a printed circuit board using LED pin leads that are soldered to connectors on the printed circuit board; connecting the zener diode in parallel with an integrating capacitor disposed on the printed circuit board so that a substantially constant output voltage is produced that is applied to the at least one LED to provide a substantially constant optical output; connecting the integrating capacitor in parallel with a full wave rectifier disposed on the printed circuit board so that a source of alternating current applied to the full wave rectifier is integrated by the integrating capacitor; connecting electrical conductors to the full wave rectifier; and molding a base around the printed circuit board, the LED pin leads, the conductors and the conductor leads to form a secure, stable base that has a standard format for C-type bulbs, so that the base fits into standard C-type bulb sockets that are attached to the source of alternating current.

DETAILED DESCRIPTION OF THE EMBODIMENTS

Figure 1:
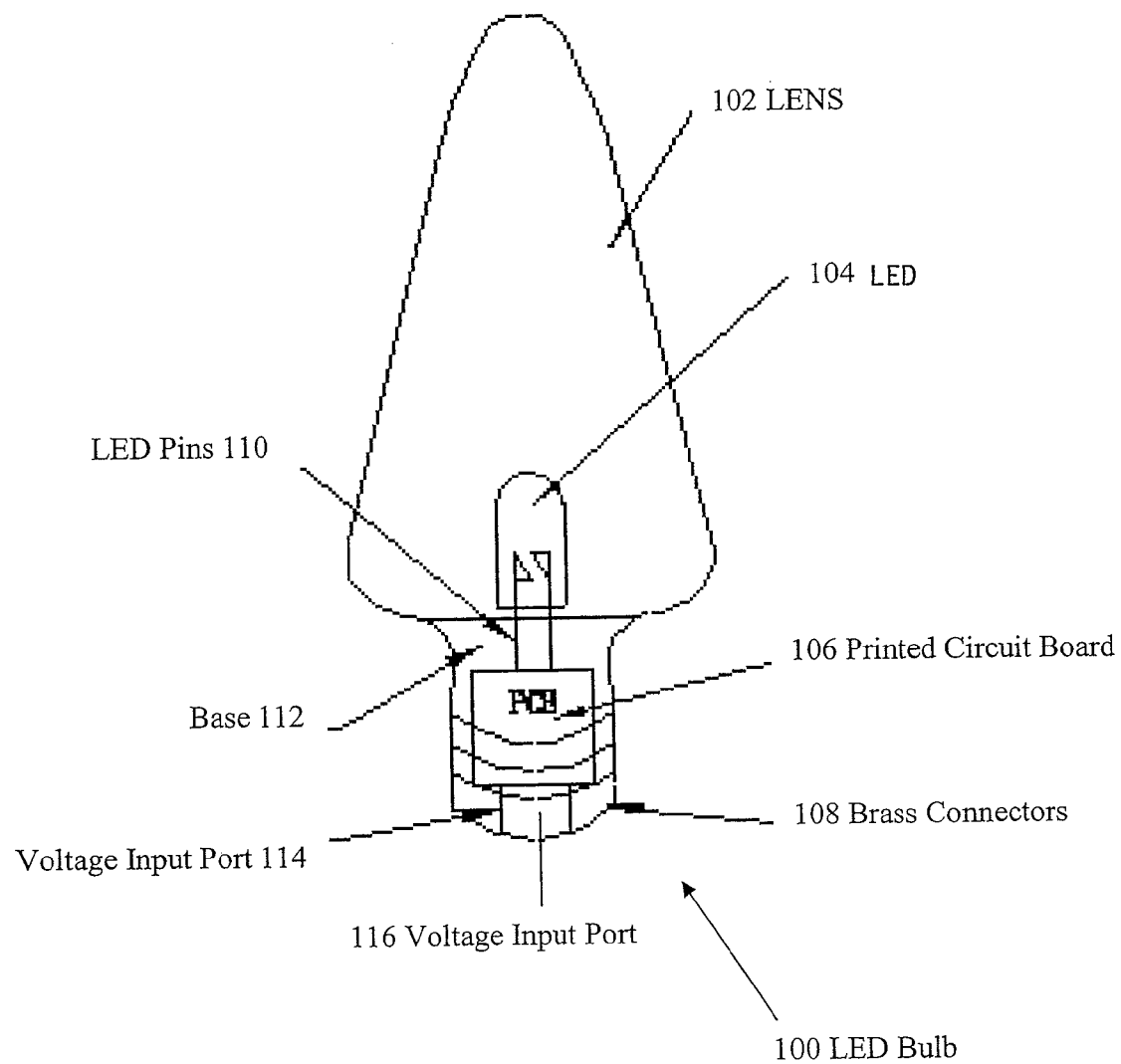
FIG. 1 is a schematic illustration of an integrated LED bulb.

FIG. 1 discloses an integrated LED bulb 100. As shown in FIG. 1, the LED bulb 100 may be a C7 type bulb, or a C9 type bulb, such as those used as screw-in Christmas tree light bulbs. The C7 type and C9 type bulbs can also have bayonet type connectors, although the screw-in type is a more common type of connector. The integrated LED bulb 100 includes a lens 102 that is connected to a base 112. Connection of the lens 102 to the base 112 can be effectuated in the manner disclosed in U.S. Provisional Patent Application 60/949,804, filed Jul. 13, 2007, entitled "Water Tight LED Lamp," which is specifically incorporated herein by reference for all that it discloses and teaches. In other words, the lens 102 may have a neck portion that is inserted into a socket in the base 112. Alternatively, base 112 and lens 102 may be attached by using thermal bonding, sonic bonding, or solvent bonding, a friction interference fit, use of an adhesive or threaded screws that allow the lens 102 to be screwed into the base 112. Further, the neck of the lens 102 may be over-molded by the base material 112 during fabrication. LED lens 102 functions as a housing for the LED 104 and is void of any materials except for air. Since, the volume inside the lens 102 contains air, the LED 104 can transmit light rays without significant attenuation. The LED lens 102 is made of a transparent material that is capable of transmitting the light generated by the LED 104 with minimal attenuation. The lens 102 can have various optical properties, including dispersion properties, diffraction properties, frosting, coloring, transport, or other options. The lens 102 can be made of a hard clear plastic material, such as calcium carbonate, glass or any other suitable material.

Typical C7 and C9 type bulbs use tungsten filaments that generate light in an evacuated bulb. Most of the electrical power is dissipated as heat in these types of bulbs. Alternatively, C7 and C9 type of bulbs have been implemented with LEDs that are encapsulated in a solid optical transmission medium, such as a plastic material. The use of the optical medium results in significant optical loss. Further, the C7 and C9 type of LED bulbs only operate on DC current and cannot be used with AC current, such as standard 110 volt AC house current.

The embodiment illustrated in FIG. 1, incorporates a printed circuit board 106 in the base 112 that converts standard household 117 volt rms alternating current into a DC signal that is applied to the LED 104. In this manner, the LED bulb 100 can be used with standard household current in standard screw-in or bayonet type sockets. The printed circuit board 106 can be over-molded directly into the base 112. In that regard, the LED pins 110 that are connected to the printed circuit board, can also be over-molded into the base 112, as illustrated in FIG. 1. The over-molding of the printed circuit board 106 and the LED pins 110, as shown in FIG. 1, provide for a stable and secure mounting of these items in the base 112. Similarly, brass connectors 108 are connected to voltage input port 114 and voltage input port 116. Voltage input port 114 and voltage input port 116 are electrically connected to the printed circuit board 106. Brass connectors 108 and voltage input ports 114, 116 are similarly molded directly into the base 112 and, as such, are securely held to the base 112. In other words, all of the components are mounted directly in the base, which can be inserted directly into the socket. This substantially minimizes the size of the integrated LED bulb and allows the integrated LED bulb to exactly match the formats of various C-type of bulbs, even when the smaller candelabra type of threaded screw base is used.

Although FIG. 1 illustrates a single LED 104, multiple LEDs can be included in the integrated LED bulb 100. Each of the LEDs 104 can be separately soldered to the printed circuit board 106. The LED lens 102 provides sufficient space for the inclusion of multiple LEDs in the LED bulb 100. Multiple LEDs increase the luminescent output of the LED bulb 100. Lens 102 is made sufficiently large to accommodate multiple LEDs 104

Figure 2:
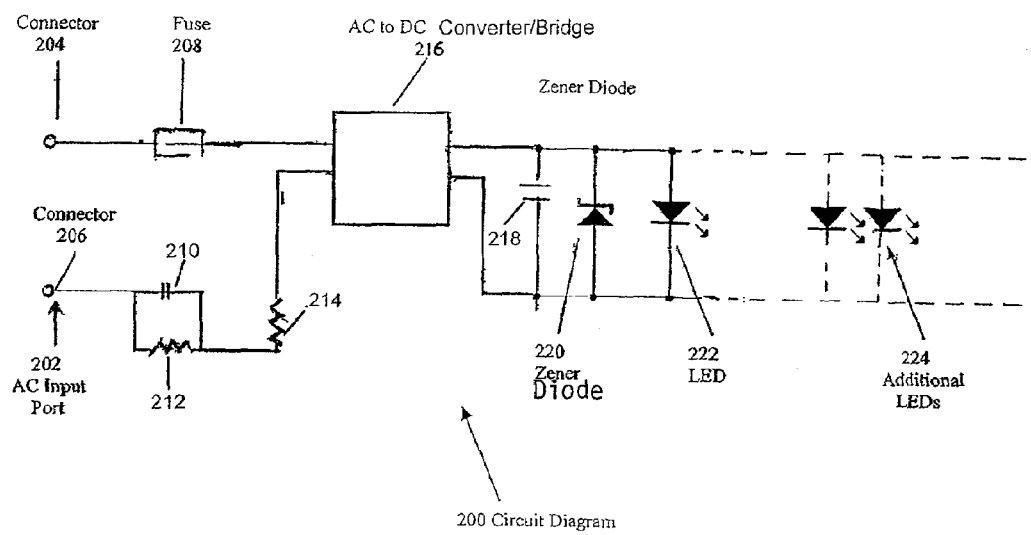
FIG. 2 is a circuit diagram of an embodiment of a printed circuit board that is used with an integrated LED bulb.

FIG. 2 is a circuit diagram 200 illustrating the circuit of the printed circuit board 106 and items connected to the printed circuit board 106. As shown in FIG. 2, the AC input port 202 has connectors 204, 206 that connect to the circuit illustrated in FIG. 2. The AC input port constitutes the brass connectors 108 illustrated in FIG. 1 that connect to a standard household 110 volt AC power source. Fuse 208 protects the circuit 200 from excessive electric current, which protects the LEDs 222 and additional LEDs 224, as well as the circuit 200 from burnout. Fuse 208 can be separately mounted in base 112 and can be replaceable, if desired, using a standard replaceable fuse housing. The parallel connected capacitor 210 and resistor 212 help to smooth the AC signal at the AC input port 202. Resistor 214 lowers the voltage that is applied to the AC to DC converter/bridge 216. The output of the AC to DC converter/bridge 216 can either be a full wave rectified signal or may be a DC signal. Capacitor 218 is sized as a larger capacitor that is capable of being charged to the peak voltage of the full wave rectified signal at the output of an AC to DC bridge, such as the full wave rectifier bridge illustrated in FIG. 3. Zener diode 220 establishes and maintains a zener voltage across the input of LED 222. The zener diode not only controls the DC voltage across the integrating capacitor 218, but also maintains a steady, constant voltage across the LED 222 and additional LEDs 224, so that no flickering occurs in the light. In other words, a constant optical output is provided by the constant voltage across the zener diode 220. As also shown in FIG. 2, additional LEDs 224 can be added in parallel to LED 222. The LED 222 and the additional LEDs 224 can be soldered directly to the printed circuit board 106. The AC to DC converter/bridge 216, as indicated above, can either be a bridge such as a full wave rectifier bridge illustrated in FIG. 3, a half wave rectifier bridge, or other type of bridge circuit, or an AC to DC converter.

Various types of AC to DC converters can be used for converter 216. For example, a simple single chip voltage regulator can be used as the AC to DC converter 216. Alternatively, circuits, such as those illustrated in U.S. Patent Application Publication No. US2005/0057187, published Mar. 17, 2005, entitled "Universal Light Emitting Illumination Device and Method," as shown in FIG. 11, and disclosed in paragraphs 40 through 44, can be used. The advantage to all of these circuits is that they can be placed on a very small printed circuit board that can be over-molded into the base of the integrated bulb, which is inserted into a standard socket. In this manner, the circuit components are protected in the base and encapsulated in a plastic housing to prevent damage. These items are not open in the lens where they can become loose or damaged, but rather are encapsulated within the base having a standard format for connection to a standard socket.

Figure 3:
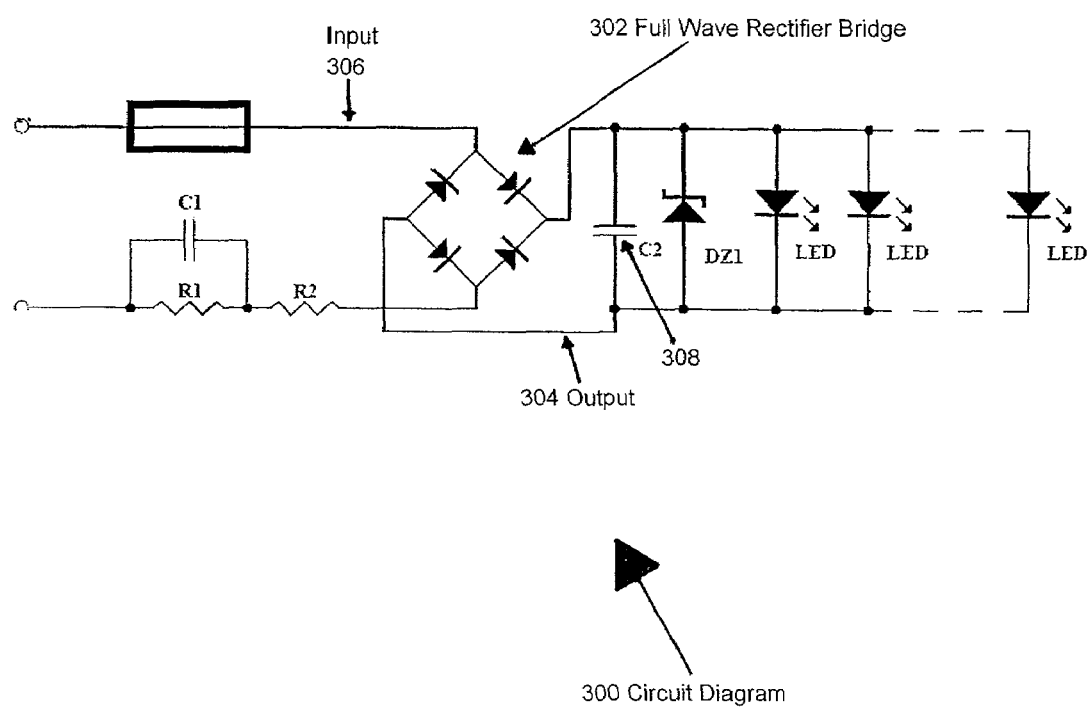
FIG. 3 is a circuit diagram of another embodiment of a printed circuit board that is used with an integrated LED bulb.

FIG. 3 is a circuit diagram 300 of an embodiment using a full wave rectifier bridge 302. As shown in FIG. 3, the full wave rectifier bridge 302 generates a full wave rectified signal at its output 304 as a result of the AC signal that is applied to the input 306. Capacitor 308 stores the peak voltage on the full wave rectified signal at the output 304. This voltage is stabilized using the zener diode 310.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated LED lamp that replaces C-type incandescent lamps comprising:
    a hollow lens having air disposed in a hollow interior portion of said hollow lens;
    a printed circuit board comprising:
        conductor leads that are connected to electrical conductors that connect to an alternating current electrical source;
        a full wave rectifier that rectifies said alternating current electrical source to generate a full wave rectified output signal;
        an integrating capacitor that integrates said full wave rectified output signal to generate an integrated direct current signal;
        a zener diode that controls the voltage level of said integrated direct current signal to produce a substantially constant output voltage;
    at least one light emitting diode disposed in said hollow lens that transmits light through said air disposed in said hollow lens with low attenuations, said light emitting diode connected in parallel with said zener diode, which generates a substantially constant optical output in response to said substantially constant output voltage produced by said zener diode, said light emitting diode having pin leads that are soldered directly to said printed circuit board;
    a lamp base having connectors that connect said integrated LED bulb to C-type bulb sockets, said lamp base forming an over-molded base that fits inside of said C-type lamp socket and is over-molded around said printed circuit board, said conductors, and said pin leads that are connected to said conductor leads on said printed circuit boards to form a secure, stable lamp base that does not cover said light emitting diode but protects said printed circuit board, said pin leads and said conductor leads, and which has a standard format for connection to C-type bulbs, so that said lamp base fits into an interior portion of said C-type bulb sockets that are attached to said alternating current electrical source, said lamp base being molded to said hollow lens to secure said hollow lens to said lamp base.

2. The integrated bulb of claim 1 wherein said integrated bulb replaces C-7 type bulbs.

3. The integrated bulb of claim 1 wherein said integrated bulb replaces C-9 type bulbs.

4. The integrated bulb of claim 1 further comprising:
a resistor and capacitor that are connected in parallel to form an RC module, said RC module connected in series to one of said conductor leads, said RC module providing complex impedance to efficiently reduce voltage levels of said alternating current electrical source.

5. A method of making an LED lamp that replaces C-type incandescent lamps comprising:
providing a hollow lens having air disposed in a hollow interior portion of said hollow lens;
providing at least one LED that is disposed in said hollow lens that transmits light through said air disposed in said hollow interior portion of said hollow lens with low dispersion;
connecting said at least one LED in parallel with a zener diode disposed on a printed circuit board using LED pin leads that are soldered to connectors on said printed circuit board;
connecting said zener diode in parallel with an integrating capacitor disposed on said printed circuit board so that a substantially constant output voltage is produced that is applied to said at least one LED to provide a substantially constant optical output;
connecting said integrating capacitor in parallel with a full wave rectifier disposed on said printed circuit board so that an alternating current electrical signal that is applied to said full wave rectifier is integrated by said integrating capacitor;
connecting electrical conductors to said full wave rectifier; and
molding a lamp base with plastic around said printed circuit board, said LED pin leads, said conductors and said conductor leads, but not around said LED, to form a secure, stable lamp base that has a standard format for C-type bulbs, so that said lamp base fits into an interior portion of standard C-type bulb sockets that are attached to said source of alternating current and light emitted from said LED is not attenuated by said plastic as a result of said LED being embedded in said plastic;
molding said lamp base to said hollow lens to secure said lens to said lamp base.

6. The method of claim 5 further comprising:
connecting a parallel connected resistor and capacitor to said electrical conductors to form an RC module that provides complex impedance that efficiently reduces voltage levels of said alternating current electrical signal.

* * * * *